US009080614B2

(12) United States Patent
Tsuda et al.

(10) Patent No.: US 9,080,614 B2
(45) Date of Patent: Jul. 14, 2015

(54) CLUTCH PLATE, CLUTCH UNIT AND DRIVING FORCE TRANSMISSION SYSTEM

(71) Applicant: JTEKT Corporation, Osaka-shi (JP)

(72) Inventors: Takuya Tsuda, Tokorozawa (JP); Junji Ando, Anjo (JP); Hiroyuki Ando, Takahama (JP)

(73) Assignee: JTEKT CORPORATION, Osaki-shi (JP)

( * ) Notice: Subject to any disclaimer, the term of this patent is extended or adjusted under 35 U.S.C. 154(b) by 0 days.

(21) Appl. No.: 14/071,828

(22) Filed: Nov. 5, 2013

(65) Prior Publication Data
US 2014/0131160 A1 May 15, 2014

(30) Foreign Application Priority Data

Nov. 14, 2012 (JP) ................. 2012-250345

(51) Int. Cl.
F16D 13/74 (2006.01)
F16D 13/64 (2006.01)

(52) U.S. Cl.
CPC .............. F16D 13/64 (2013.01); F16D 13/74 (2013.01); F16D 2250/0046 (2013.01); F16D 2300/10 (2013.01)

(58) Field of Classification Search
USPC .................................................. 192/113.36
See application file for complete search history.

(56) References Cited

U.S. PATENT DOCUMENTS 2,419,253 A * 4/1947 Cahill ........................... 508/166
3,347,107 A * 10/1967 Flichy ................................ 476/7
4,022,298 A * 5/1977 Malinowski .................. 188/71.6
4,291,794 A * 9/1981 Bauer ....................... 192/107 M
4,958,712 A * 9/1990 Suganuma et al. ......... 192/70.12
6,158,561 A * 12/2000 Sakai et al. ...................... 192/35
6,920,968 B2 * 7/2005 Sakai et al. ...................... 192/35
2007/0108009 A1 * 5/2007 Ando et al. ................. 192/70.14
2008/0142331 A1 * 6/2008 Miyazaki et al. .......... 192/70.12
2008/0146474 A1 * 6/2008 Takahashi et al. ............ 508/390

(Continued)

FOREIGN PATENT DOCUMENTS

DE 102010015213 * 10/2011
JP 11-294488 10/1999

(Continued)

OTHER PUBLICATIONS

U.S. Appl. No. 13/952,018, filed Jul. 26, 2013, Junji Ando, et al.

Primary Examiner — Ramya Burgess
Assistant Examiner — Mark Manley
(74) Attorney, Agent, or Firm — Oblon, McClelland, Maier & Neustadt, L.L.P.

(57) ABSTRACT

An annular wet clutch plate has lubrication grooves formed of multiple grooves in at least one of both axial end faces, the at least one of the both end faces having the lubrication grooves and a frictional engagement surface. The frictional engagement surface has a plurality of small grooves having a width and a depth that are smaller than those of the lubrication grooves. At least one of the small grooves is extended in a direction that crosses a circumferential direction of the annular clutch plate. A mean value of surface roughness of the frictional engagement surface having the small grooves is from 3.0 μm to 4.0 μm when the surface roughness is measured with the use of Rz at three positions that are offset from each other by 120° in the circumferential direction around a central axis of the annular clutch plate.

11 Claims, 7 Drawing Sheets

(56) References Cited

U.S. PATENT DOCUMENTS

2011/0114438 A1* 5/2011 Sudau et al. ............ 192/113.36
2011/0164900 A1* 7/2011 Onishi ......................... 399/223
2013/0186727 A1 7/2013 Ando et al.

FOREIGN PATENT DOCUMENTS

| JP | 2002-213485 | 7/2002 |
| JP | 2006-29446 | 2/2006 |
| WO | 2013/027834 A1 | 2/2013 |

* cited by examiner

CLUTCH PLATE, CLUTCH UNIT AND DRIVING FORCE TRANSMISSION SYSTEM

INCORPORATION BY REFERENCE

The disclosure of Japanese Patent Application Publication No. 2012-250345 filed on Nov. 14, 2012 including the specification, drawings and abstract, is incorporated herein by reference in its entirety.

BACKGROUND OF THE INVENTION

1. Field of the Invention

The invention relates to a wet clutch plate having lubrication grooves, a clutch unit including the clutch plate, and a driving force transmission system including the clutch plate.

2. Description of Related Art

A friction clutch that performs power transmission by frictionally engaging drive-side clutch plates and driven-side clutch plates with each other has been conventionally known. Further, an electromagnetic friction clutch that includes clutch plates each having a plurality of windows that are arc-shaped through-holes has been known. The windows are required to form magnetic circuits. Such an electromagnetic friction clutch is described in each of Japanese Patent Application Publication No. 11-294488 (JP 11-294488 A), Japanese Patent Application Publication No. 2002-213485 (JP 2002-213485 A) and Japanese Patent Application Publication No. 2006-029446 (JP 2006-029446 A). The electromagnetic clutch is used in, for example, an electronically-controlled 4WD coupling (ITCC (registered trademark)).

Lubricating oil is present between the clutch plates. Further, lubrication grooves are formed in axial end faces (sliding surfaces) of the clutch plates. When the clutch plates are engaged with each other, the lubricating oil is retained in the lubrication grooves, and the lubricating oil escapes from between the clutch plates through the lubrication grooves.

In the wet clutch mechanism in which the lubricating oil is present between the clutch plates as described above, the torque at a low temperature (for example, below or equal to 0° C.) increases as the viscosity of the lubricating oil increases. If the rate of change of a torque (torque change rate) at a low temperature with respect to a torque at a high temperature becomes higher, it becomes difficult to improve, for example, the operational feeling. Therefore, reduction in torque change rate has been demanded.

SUMMARY OF THE INVENTION

One object of the invention is to provide a clutch plate, a clutch unit and a driving force transmission system, which are configured such that the torque change rate is reduced.

An aspect of the invention relates to an annular wet clutch plate having lubrication grooves formed of multiple grooves in at least one of both axial end faces, the at least one of the both end faces having the lubrication grooves and a frictional engagement surface. The frictional engagement surface has a plurality of small grooves having a width and a depth that are smaller than those of the lubrication grooves. At least one of the small grooves is extended in a direction that crosses a circumferential direction of the annular clutch plate. A mean value of surface roughness of the frictional engagement surface having the small grooves is a value equal to or higher than 3.0 μm but equal to or less than 4.0 μm when the surface roughness is measured with the use of Rz (JIS B 0601:1982) at three positions that are offset from each other by 120° in the circumferential direction around a central axis of the annular clutch plate.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, an example embodiment of the invention will be described in detail. In the present embodiment, a clutch plate according to the invention is used as a clutch plate of a pilot clutch mechanism for an electronically-controlled 4WD coupling. Note that the clutch plate according to the invention may be applied to various other clutch mechanisms. Further, the electronically-controlled 4WD coupling corresponds to one of driving force transmission systems, and accordingly, the electronically-controlled 4WD coupling will be hereinafter referred to as "driving force transmission system".

Figure 1:
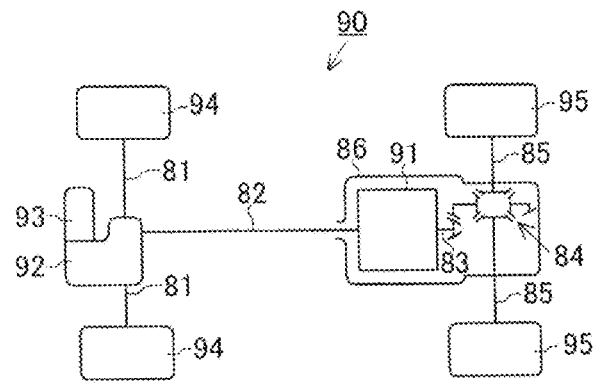
FIG. 1 is a view illustrating a four-wheel-drive vehicle in an embodiment of the invention.
Figure 2:
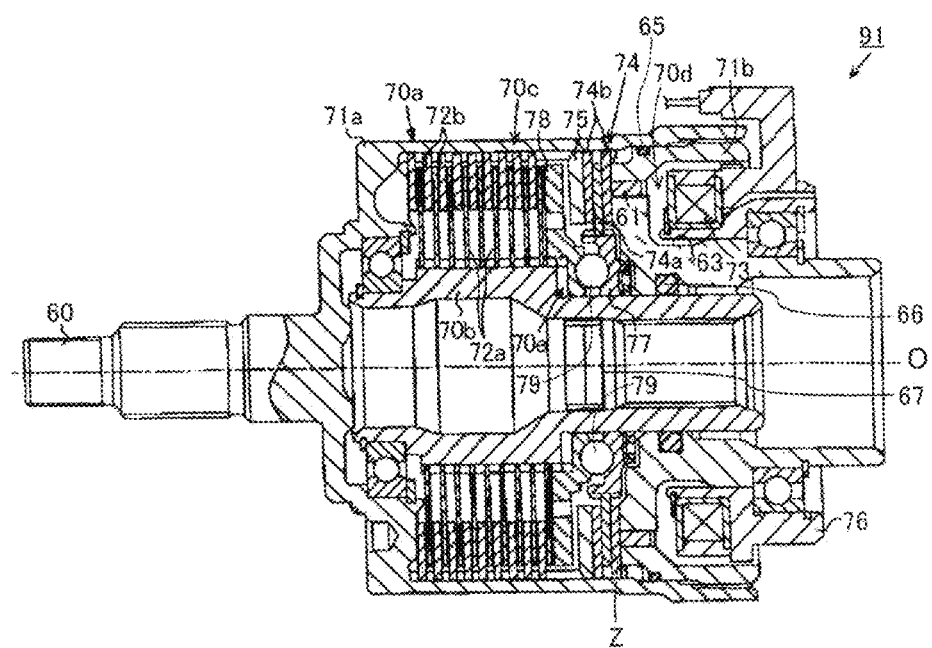
FIG. 2 is a partially sectional view illustrating a driving force transmission system in the embodiment.

With reference to FIG. 1 and FIG. 2, a driving force transmission system 91 will be described. As illustrated in FIG. 1, a four-wheel-drive vehicle 90 includes the driving force transmission system 91, a transaxle 92, an engine 93, a pair of front wheels 94, and a pair of rear wheels 95. The driving force from the engine 93 is transmitted to axle shafts 81 through the transaxle 92 to drive the front wheels 94.

The transaxle 92 is connected to the driving force transmission system 91 via a propeller shaft 82. The driving force transmission system 91 is connected to a rear differential gear 84 via a drive pinion shaft 83. The rear differential gear 84 is connected to the rear wheels 95 via axle shafts 85. When the propeller shaft 82 and the drive pinion shaft 83 are connected to each other by the driving force transmission system 91 in order to allow torque transmission, the driving force from the engine 93 is transmitted to the rear wheels 95.

The driving force transmission system 91 is accommodated, for example, together with the rear differential gear 84, in a differential carrier 86, and is supported by the differential carrier 86. The driving force transmission system 91 is supported by a vehicle body via the differential carrier 86.

As illustrated in FIG. 2, the driving force transmission system 91 is formed mainly of an outer case 70a, an inner shaft 70b, a main clutch mechanism 70c, a pilot clutch mechanism 70d, and a cam mechanism 70e. The outer case 70a serves as an outer rotary member, and the inner shaft 70b serves as an inner rotary member.

The outer case 70a is formed of a front housing 71a having a bottomed cylindrical shape and a rear housing 71b. The rear housing 71b is screwed into an opening portion of one axial side (right side in FIG. 2) end portion of the front housing 71a so as to cover the opening. An input shaft 60 is formed so as to be projected from the other axial side (left side in FIG. 2) end portion of the front housing 71a, and the input shaft 60 is coupled to the propeller shaft 82.

The front housing 71a with which the input shaft 60 is integrally formed, and the rear housing 71b are made of iron that is a magnetic material. A cylindrical body 61 made of stainless steel, which is a nonmagnetic material, is embedded in a radially middle portion of the rear housing 71b, and the cylindrical body 61 constitutes an annular nonmagnetic portion.

The outer case 70a is supported so as to be rotatable relative to the differential carrier 86 via a bearing or the like (not shown), at the outer periphery of a front end portion of the front housing 71a. The outer case 70a is supported via a bearing or the like by a yoke 76 that is supported by the differential carrier 86, at the outer periphery of the rear housing 71b.

The inner shaft 70b is liquid-tightly extended through a center portion of the rear housing 71b, is inserted into the front housing 71a, and is supported so as to be rotatable relative to the front housing 71a and the rear housing 71b with axial movement of the inner shaft 70b restricted. A distal end portion of the drive pinion shaft 83 is inserted into the inner shaft 70b. Note that the drive pinion shaft 83 is not illustrated in FIG. 2.

The main clutch mechanism 70c is a wet multi-disc clutch mechanism. The main clutch mechanism 70c includes a plurality of inner clutch plates 72a and a plurality of outer clutch plates 72b. The inner clutch plates 72a are made of iron, and paper-based materials are applied onto sliding surfaces of the inner clutch plates 72a. The outer clutch plates 72b are made of iron. The inner clutch plates 72a and the outer clutch plates 72b are arranged radially inward of the front housing 71a.

The inner clutch plates 72a constituting the clutch mechanism are spline-fitted to the outer periphery of the inner shaft 70b so as to be axially movable. The outer clutch plates 72b are spline-fitted to the inner periphery of the front housing 71a so as to be axially movable. The inner clutch plates 72a and the outer clutch plates 72b are arranged alternately in the axial direction, and can be not only brought into contact with each other so as to be frictionally engaged with each other, but also separated from each other so as to be disengaged from each other (placed in a free state).

The pilot clutch mechanism 70d includes an electromagnet 73, a friction clutch group 74 and an armature 75. The electromagnet 73 and the armature 75 constitute an electromagnetic drive device.

The yoke 76 is supported with respect to the differential carrier 86 through spigot joint, and is supported so as to be rotatable relative to the outer periphery of a rear end portion of the rear housing 71b. The electromagnet 73 having an annular shape is fitted to the yoke 76, and the electromagnet 73 is disposed in annular recess 63 of the rear housing 71b.

The friction clutch group 74 is formed as a multi-disc friction clutch composed of a single inner pilot clutch plate 74a made of iron, and two outer pilot clutch plates 74b made of iron. Note that, in an embodiment which will be described later, the invention is applied to the inner pilot clutch plate 74a.

The inner pilot clutch plate 74a is spline-fitted to the outer periphery of a first cam member 77 constituting the cam mechanism 70e so as to be movable relative to the first cam member 77 in the axial direction but immovable relative to the first cam member 77 in the circumferential direction. The outer pilot clutch plates 74b are spline-fitted to the inner periphery of the front housing 71a so as to be movable relative to the front housing 71a in the axial direction but immovable relative to the front housing 71a in the circumferential direction. The inner shaft 70b that moves with the first cam member 77 may function as "first rotary member", and the front housing 71a may function as "second rotary member".

The inner pilot clutch plate 74a and the outer pilot clutch plates 74b are arranged alternately in the axial direction, and can be not only brought into contact with each other so as to be frictionally engaged with each other, but also separated from each other so as to be disengaged from each other (placed in a free state).

The cam mechanism 70e includes the first cam member 77, a second cam member 78 and cam followers 79. The second cam member 78 is spline-fitted to the outer periphery of the inner shaft 70b so as to be movable in the axial direction, and is fitted to the inner shaft 70b so as to be rotatable together with the inner shaft 70b. The second cam member 78 is arranged so as to be opposed to the inner clutch plates 72a of the main clutch mechanism 70c. The cam followers 79 having a ball shape are interposed between cam grooves of the second cam member 78 and the first cam member 77, the cam grooves being opposed to each other.

In the driving force transmission system 91, when an electromagnetic coil of the electromagnet 73 constituting the pilot clutch mechanism 70d is de-energized, no magnetic path is formed, and accordingly, the friction clutch group 74 is in a disengaged state. In this case, the pilot clutch mechanism 70d is in a non-operating state, and the first cam member 77 constituting the cam mechanism 70e is rotatable together with the second cam member 78 via the cam followers 79. As a result, the main clutch mechanism 70c is in a non-operating state. Thus, the four-wheel-drive vehicle 90 travels in a two-wheel-drive mode.

On the other hand, when the electromagnetic coil of the electromagnet 73 is energized, a magnetic path is formed in the pilot clutch mechanism 70d, and the electromagnet 73 attracts the armature 75. In this case, the armature 75 presses the friction clutch group 74 in the axial direction so as to frictionally engage the friction clutch group 74 to couple the first cam member 77 of the cam mechanism 70e with the front housing 71a side, thereby causing relative rotation between the first cam member 77 and the second cam member 78. As a result, in the cam mechanism 70e, the cam followers 79 press the cam members 77, 78 in such directions that the cam members 77, 78 are separated from each other.

As a result, the second cam member 78 is pressed toward the main clutch mechanism 70c, and accordingly, the main clutch mechanism 70c is frictionally engaged in accordance with a frictional engaging force of the friction clutch group 74 to transmit torque between the outer case 70a and the inner shaft 70b. Thus, the four-wheel-drive vehicle 90 travels in a four-wheel-drive mode in which the propeller shaft 82 and the drive pinion shaft 83 are connected to each other.

That is, when the inner pilot clutch plate 74a and the outer pilot clutch plates 74b are engaged with each other, the front housing 71a and the inner shaft 70b are placed in a state in which transmission of torque therebetween is allowed. When the inner pilot clutch plate 74a and the outer pilot clutch plates 74b are separated from each other, the front housing 71a and the inner shaft 70b are placed in a state in which transmission of torque therebetween is interrupted. The armature 75 and the rear housing 71b (or the cylindrical body 61) may function as "first pressing member" and "second pressing member", respectively, and fasten the inner pilot clutch plate 74a and the outer pilot clutch plates 74b therebetween so as to form a frictionally engaged state. The "pressing members" include a member that indirectly presses the clutch plates.

When the current applied to the electromagnetic coil of the electromagnet 73 is increased to a predetermined value, the force of the electromagnet 73 for attracting the armature 75 is increased. Thus, the armature 75 is strongly attracted toward the electromagnet 73, and the frictional engaging force of the friction clutch group 74 is increased. Thus, relative rotation between the cam members 77, 78 is facilitated. As a result, the cam followers 79 increases the pressing force applied to the second cam member 78 so as to place the main clutch mechanism 70c in a connected state. Thus, the four-wheel-drive vehicle 90 is placed in a four-wheel-drive mode in which the propeller shaft 82 and the drive pinion shaft 83 are directly connected to each other. The torque change rate of the inner pilot clutch plate 74a and the outer pilot clutch plates 74b exerts influence on the operational feeling or the like.

A clutch plate 1 in the present embodiment will be described with reference to FIG. 3 to FIG. 10. The clutch plate 1 is applied to, for example, the aforementioned inner pilot clutch plate 74a.

Figure 3:
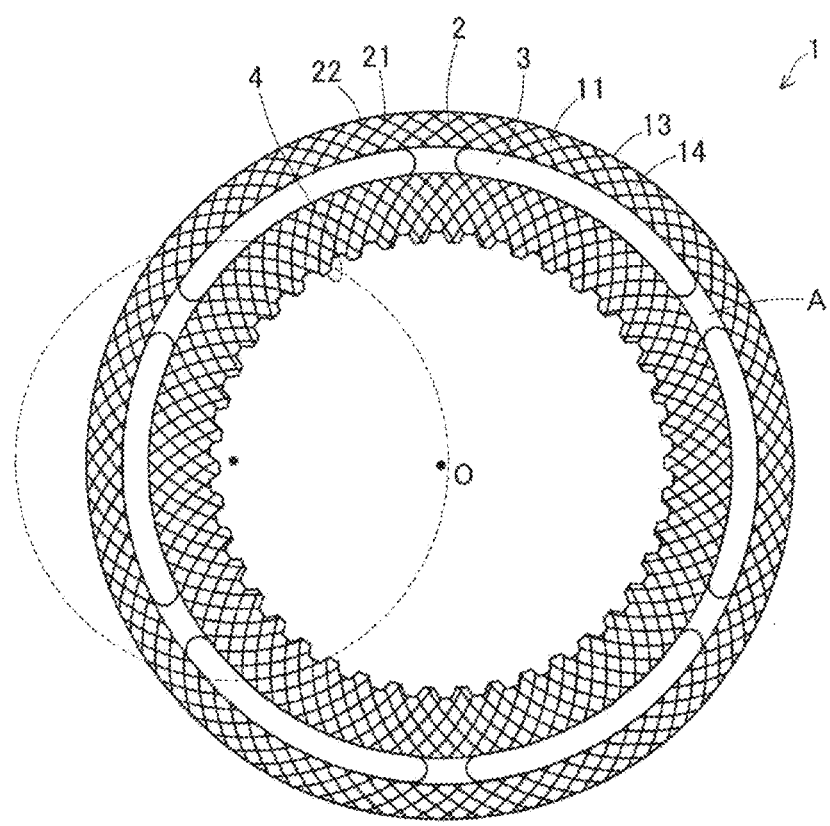
FIG. 3 is a front view illustrating a clutch plate in the embodiment.

As illustrated in FIG. 3, the clutch plate 1 is formed of an annular magnetic metal plate, and lubrication grooves 2 are formed in each of one axial end face 11 and the other axial end face (not shown) of the clutch plate 1. The lubrication grooves 2 formed in the other axial end face are similar to those formed in the one axial end face 11. Note that the axial direction is a direction that is in parallel with the central axis O of the annular clutch plate 1, that is, the axial direction is in parallel with the input shaft 60.

The end face 11 has the lubrication grooves 2 and a frictional engagement surface 13 at which the plates are frictionally engaged with each other. In more detail, the end face 11 is mainly formed of the lubrication grooves 2, windows 3, bridges A, the frictional engagement surface 13, and connecting portions (not shown). That is, the frictional engagement surface 13 is a portion of the end face 11 other than the lubrication grooves 2, the windows 3 and the bridges A. Specifically, the frictional engagement surface 13 is a portion (may be referred to as "frictional engagement portion") of the end face 11, which is frictionally engaged with the mating clutch plate (the clutch plate with which the frictional engagement surface 13 is engaged). The frictional engagement surface 13 is formed of a plurality of lands 14 (corresponding to hills). Each of the lands 14 is surrounded by grooves 21 that constitute the lubrication grooves 2, and has an actual engagement surface 141 and a plurality of small grooves 15 (refer to FIG. 5). The lands 14 will be detailed later. The connecting portions connect the grooves 21 constituting the lubrication grooves 2, with the lands 14. Each of the connecting portions may be crowning (shear drop), or may be a portion (extended portion) of a side surface of the corresponding groove 21. In the present embodiment, the connecting portions are crowning.

The lubrication grooves 2 are formed so as to receive excess lubricating oil Z present between the pilot clutch plates 74a, 74b. That is, the clutch plate 1 is a wet clutch plate. The lubrication grooves 2 have not only the function of receiving the lubricating oil Z between the clutch plates but also the function of causing the lubricating oil to escape from between the plates. With this configuration, it is possible to smoothly engage the plates with each other.

Further, a plurality of the windows 3, which are arc-shaped through-holes and pass through the clutch plate 1 in the axial direction, is formed in a substantially radial center portion of the end face 11 of the clutch plate 1. The windows 3 are located on the same circumference. The windows 3 are required to form an appropriate magnetic circuit (magnetic path) in the pilot clutch mechanism. Further, splines 4 are formed in the inner peripheral edge of the clutch plate 1.

Figure 4:
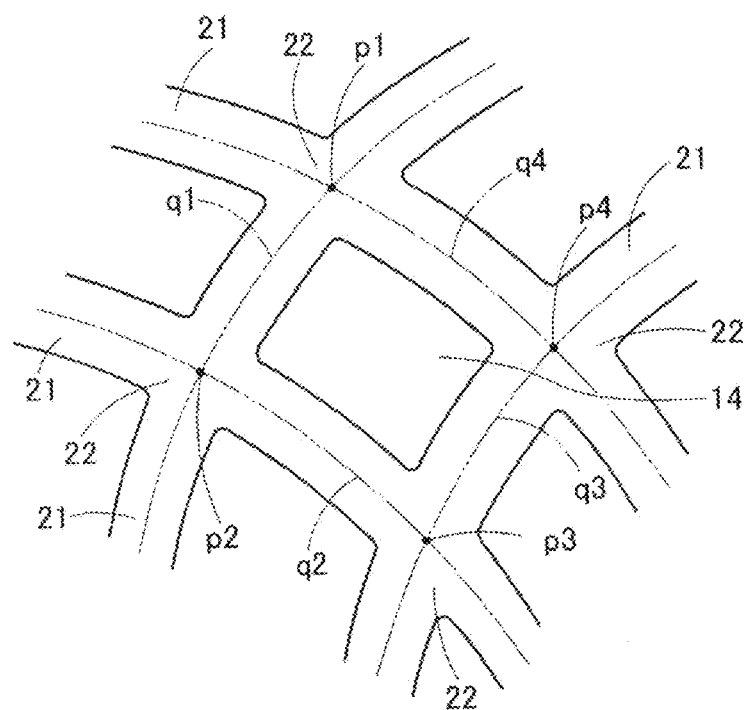
FIG. 4 is a conceptual view illustrating grooves and lands in the embodiment.
Figure 5:
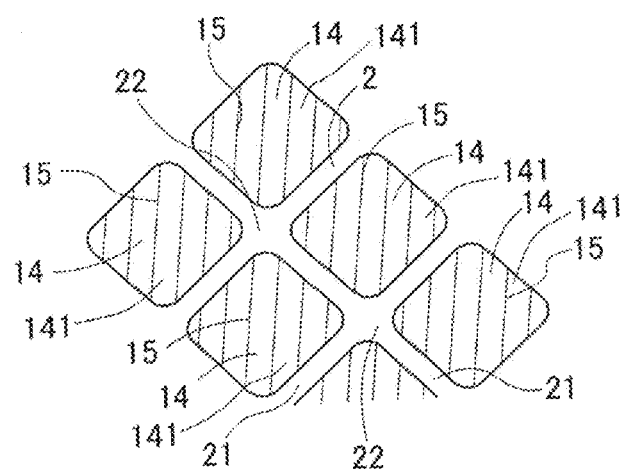
FIG. 5 is a conceptual view illustrating small grooves in the embodiment.

As illustrated in FIG. 3 to FIG. 5, the lubrication grooves 2 are formed of the grooves 21. Each of the grooves 21 is formed of one side surface, a bottom surface and the other side surface. The side surfaces of each groove 21 are connected to the corresponding lands 14 via the connecting portions. Specifically, as viewed in a section of the clutch plate 1 taken along the axial direction, the bottom surface of each groove 21 is located at an axially innermost position within the groove 21, the side surfaces of the groove 21 are extended axially outward from the bottom surface, the connecting portions are extended axially outward form the side surfaces of the groove 21, and the lands 14 are connected to the axially outer end portions of the connecting portions. The lubrication grooves 2 are present over the entirety of the end face 11, and are extended from the center portion of the end face 11 to both the outer peripheral edge and the inner peripheral edge (the edges of the splines 4). The lubrication grooves 2 are formed over the entire end face, except the windows 3 and the portions (bridges A) between the windows 3. Note that the connecting portions may be omitted.

In the present embodiment, the lubrication grooves 2 are formed in a lattice pattern (meshed pattern). The grooves 21 are extended from the outer peripheral edge to the windows 3 or the bridges A on the outer peripheral side, and the grooves 21 are extended from the windows 3 or the bridges A to the inner peripheral edge (the edges of the splines 4) on the inner peripheral side. That is, the grooves 21 constituting the lubrication grooves 2 are extended in such directions that the grooves 21 cross each other in the circumferential direction, on the end face 11. Further, the lubrication grooves 2 have a plurality of intersection points 22 at which the grooves 21 contact each other (cross each other in the present embodiment). As described above, the side surfaces of each groove 21 are connected to the connecting portions (crowning), and the connecting portions are connected to the lands 14.

Each of the lands 14 is a portion that is defined and surrounded by the grooves 21 and the connecting portions. If no connecting portions are present, each of the lands 14 is a portion that is defined and surrounded by the grooves 21. The grooves 21 are defined by their center lines. The center lines of the grooves 21 coincide with "differentiable curves", and have "non-differentiable points" at which multiple differentiable curves cross each other. The width of each of the grooves 21 corresponds to a distance that is obtained by adding one side surface, the bottom surface and the other side surface of the groove 21 together in a direction perpendicular to a tangent to the corresponding differential curve and also perpendicular to the axial direction of the clutch plate 1 (will be hereinafter referred to as "groove widthwise direction"). In other words, each groove width is the maximum value of the clearance between the one side surface and the other side surface of the groove 21 in the groove widthwise direction. Each of the lands (hills) 14 is defined and surrounded by at least two non-differentiable points located on the center lines of the grooves, and the differentiable curves (the number of the differentiable curves is equal to the number of the non-differentiable points) that connect the non-differentiable points and that coincide with the center lines of the grooves 21.

Specifically, as illustrated in FIG. 4, the intersection points 22 at which the groove center lines of the grooves 21 cross each other are non-differentiable points p1 to p4, and a curve connecting the point p1 and the point p2 to each other is a differentiable curve q1, a curve connecting the point p2 and the point p3 to each other is a differentiable curve q2, a curve connecting the point p3 and the point p4 to each other is a differentiable curve q3, and a curve connecting the point p4 and the point p1 to each other is a differentiable curve q4. Thus, each of the lands 14 according to the present embodiment is defined and surrounded by the four non-differentiable points p1 to p4 and the four differentiable curves q1 to q4. In the present embodiment, the curves q1 to q4 have substantially the same length.

More specifically, the grooves 21 are formed along the loci of virtual circles (or virtual spheres) having center points that are located inside of the clutch plate 1 (inward of the splines 4) so as to cross each other in the circumferential direction (rotational direction) of the clutch plate 1 (refer to the dashed lines in FIG. 3). The grooves 21 are formed so as to correspond to multiple virtual circles having center points that are different from each other. The center points of the virtual circles are located at equal intervals in the circumferential direction, on a second virtual circle around the center of the clutch plate 1.

Each of the lands 14 has a plurality of small grooves 15, as illustrated in FIG. 5, which are recessed in the thickness direction from the outer surface of the land 14. That is, each of the lands 14 is formed of the substantially planer actual engagement surface 141 to be frictionally engaged, that is substantially planar, and the small grooves 15. The frictional engagement surface 13 is formed of the lands 14 (each having the actual engagement surface 141 and the small grooves 15). The clutch plates are brought into contact with each other directly or via the lubricating oil so as to be frictionally engaged with each other. Each small groove 15 has a width, a depth and a length all of which are smaller than those of each groove 21. The small grooves 15 are extended in substantially the same direction (or along multiple circles having the same curvature but having different radii). In the present embodiment, the small grooves 15 are extended substantially in parallel with a certain radial direction of the clutch plate 1. Thus, the small grooves 15 of the lands 14 in a part of the clutch plate 1 are perpendicular to the circumferential direction (rotational direction) of the clutch plate 1, but the small grooves 15 in another part of the clutch plate, which is located at a position that is apart by 90° from the aforementioned part, are extended in parallel with the circumferential direction of the clutch plate 1. In the other parts, the small grooves 15 cross the circumferential direction of the clutch plate. On the assumption that the phase of the aforementioned part is 0°, the small grooves 15 in the parts located respectively at the angular positions of 0° and 180° of the clutch plate 1 are perpendicular to the circumferential direction of the clutch plate 1, but the small grooves 15 in the parts located respectively at the angular positions of 90° and 270° of the clutch plate 1 are extended in parallel with the circumferential direction of the clutch plate 1. The small grooves 15 are extended from one end to the other end of each of the lands 14.

Figure 6:
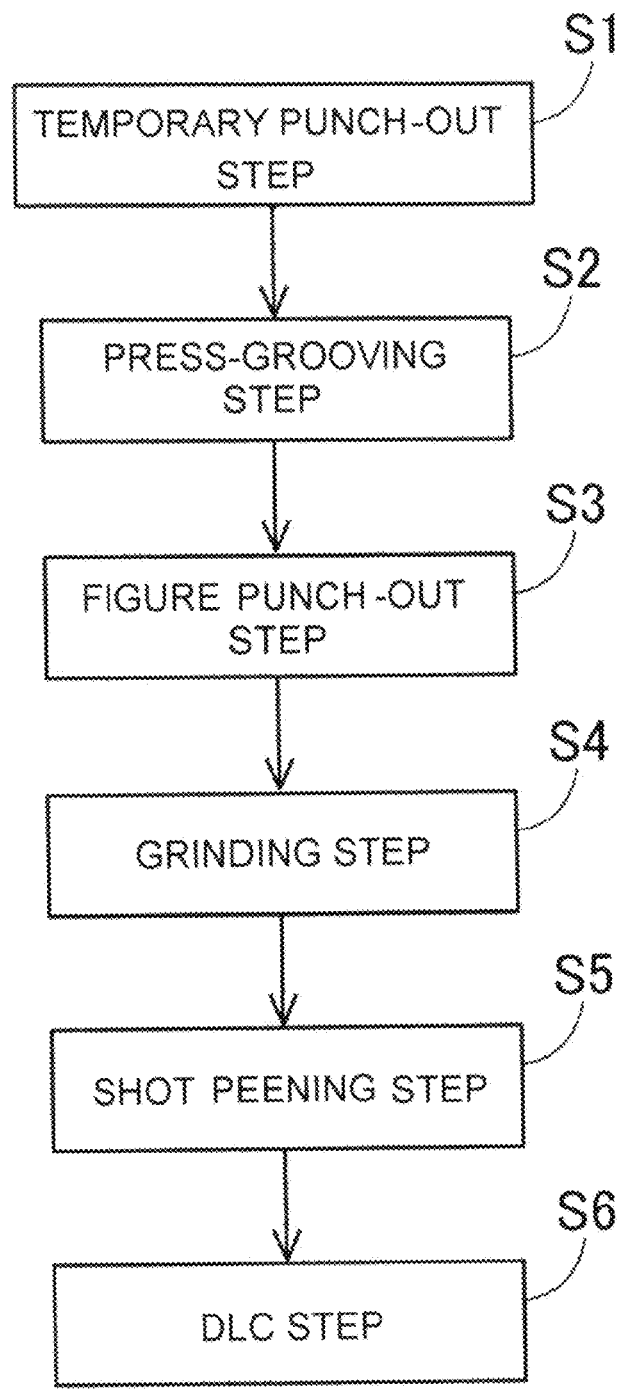
FIG. 6 is a process chart for explaining steps of manufacturing the clutch plate in the embodiment.

The method of manufacturing the clutch plate includes press working. The method of manufacturing the clutch plate 1 mainly includes, as illustrated in FIG. 6, a temporary punch-out step S1, a press-grooving step S2, a figure punch-out step S3, a grinding step S4, a shot peening step S5 and a DLC step S6.

In the temporary punch-out step S1, an inner peripheral edge and an outer peripheral edge of the clutch plate 1 are roughly formed in a magnetic metal plate (an iron plate in the present embodiment). In the press-grooving step S2, dies for forming the lubrication grooves 2 are pressed against the both end faces of the iron plate. In the figure punch-out process S3, the inner peripheral edge (splines 4 in the present embodiment), the outer peripheral edge and the windows 3 of the clutch plate 1 are formed. The grinding step S4 is a step which is carried out after the press-grooving step S2, and in which the frictional engagement surface 13 is ground so as to enhance the flatness of the frictional engagement surface 13. In the present embodiment, the clutch plate 1 is ground in one direction in the grinding step S4, and as a result, grinding marks (grinding grooves) that extend in the grinding direction are formed in the end face 11 (also in the other end face) of the clutch plate 1. The marks or scratches formed by the grinding constitute the small grooves 15. That is, all the small grooves 15 in the present embodiment are formed by the grinding in the grinding step S4.

The shot peening step S5 is a step in which shot blasting is applied onto the both end faces of the clutch plate 1 to adjust the surface roughness of the both end faces that are roughened in the grinding step S4. The DLC step S6 is a step in which the clutch plate 1 is subjected to a DLC (diamond-like carbon) process. Specifically, in the DLC step S6, the entire surfaces of the clutch plate 1 are covered with a DLC film. The surface roughness of the clutch plate 1 is not changed substantially before and after the DLC step S6.

The clutch plate 1 in the present embodiment is formed such that the frictional engagement surface 13 in which the small grooves 15 are formed has a surface roughness Rz (JIS B 0601:1982) that is in a range from 3.0 μm to 4.0 μm as measured after the shot peening step S5. That is, after the small grooves 15 are formed, the surface roughness of the frictional engagement surface 13 becomes a value equal to or greater than 3.0 μm but equal to or less than 4.0 μm with the use of Rz (JIS B 0601:1982). Further, in the present embodiment, the sliding area ratio which is a ratio of the frictional engagement surface 13 to the end face 11 is in a range from 55 to 90%.

Figure 7:
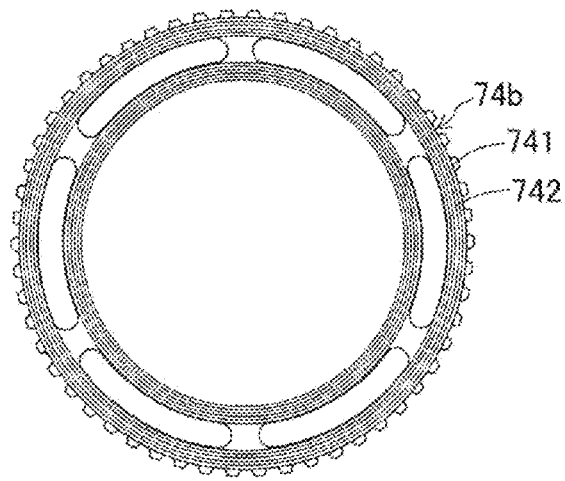
FIG. 7 is a front view illustrating an outer pilot clutch plate in the embodiment.

Each outer pilot clutch plate (which may function as "second clutch plate") 74b in the present embodiment has, as illustrated in FIG. 7, a second frictional engagement surface 741 and a plurality of annular grooves 742 in its end face. The second frictional engagement surface 741 is engaged with the frictional engagement surface 13. The annular grooves 742 have the center (will be referred to as "second center" where appropriate) that coincides with the center of the outer pilot clutch plate 74b. The annular grooves 742 are grooves extended along circles that are located around the second center and that have different radii. The annular grooves 742 may be spiral grooves around the second center.

Clutch plates in the following examples were formed by the manufacturing method in the embodiment as described above. That is, in the following examples, a plurality of the grooves 15 was formed by grinding in one direction in the grinding step S4.

Figure 8:
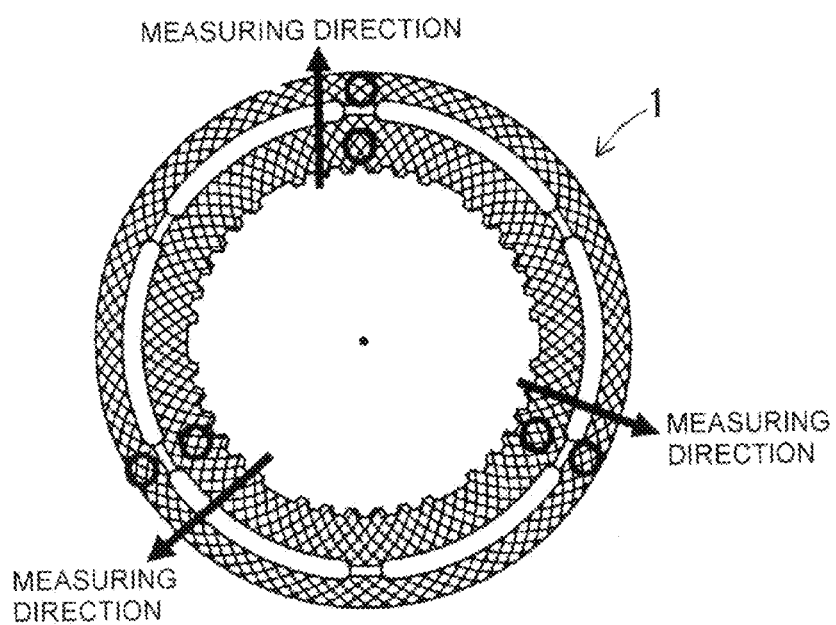
FIG. 8 is a front view of the clutch plate, illustrating measuring positions in examples.

A method of measuring the surface roughness Rz (JIS B 0601:1982) in the following examples will be described with reference to FIG. 8. The clutch plate 1 to be measured was the one after the shot peening step S5 but before the DLC step S6. At first, a certain phase (angular position) of the end face 11 of the clutch plate 1 was set to be measured. Specifically, as indicated by circles in FIG. 8, for the certain phase, two parts, one of which is around the center on the inner peripheral side and the other of which is around the center on the outer peripheral side, were set to be measured. The inner peripheral side and the outer peripheral side are defined by the windows 3 and the bridges A.

Next, a portion of the clutch plate 1, of which the phase is offset from the phase of the above-described certain phase by 120°, was set to be measured. Specifically, as described above, for this phase, two parts, one of which is around the center on the inner peripheral side and the other of which is around the center on the outer peripheral side, were set to be measured. Then, another portion of the clutch plate 1, of which the phase is offset from the phase of the above-described phase by 120°, was set to be measured. For this phase, two parts, one of which is around the center on the inner peripheral side and the other of which is around the center on the outer peripheral side, were set to be measured. That is, in the following examples, the surface roughness of the clutch plate 1 was measured at intervals of 120° in the circumferential direction. In other words, the surface roughness was measured at three phases that are offset from each other by 120° in the circumferential direction of the clutch plate 1, starting from the certain measuring position.

Measurements similar to the measurements as described above were carried out on the other end face. The surface roughness was measured at six points on one end face 11 and six points on the other end face, that is, twelve points in total. The surface roughness Rz (JIS B 0601:1982) in the following examples was a mean value of surface roughness at the twelve points. The surface roughness Rz (JIS B 0601:1982) may be a ten-point mean surface roughness. Note that the JIS code number as to Rz is JIS B 0601:1982)

Next, the method of measuring the surface roughness in the following examples will be described. First, the directions of the measurements on the measuring positions (refer to the circles indicated in FIG. 8) were set to directions extending radially outward from the center of the clutch plate 1, as indicated by the arrows in FIG. 8. Surfcorder SE3500 (manufactured by Kosaka Laboratory Ltd.) was used as a measuring device. The length to be evaluated was set to 0.8 mm while the cut-off was set to R W. The filtering process was set to 2RC. The feed rate was set to 0.1 mm/sec. The diameter of a stylus was set to 2 µm. The parameter to be evaluated was Rz (JIS B 0601:1982) as described above.

Further, a torque change rate in the following examples was a rate of change of a torque B at a temperature of −40° C. with respect to a torque A at a temperature of 50° C., that is, (B−A)/A, at a constant current value (note that the torque change rate will be indicated by a percentage (%) in the following examples). In the measurements of torque, the outer pilot clutch plates 74b shown in FIG. 7 was used as a clutch plate frictionally engaged with the clutch plate 1. The sliding area ratio of the clutch plate in the following examples was approximately 58%.

The surface roughness Rz (JIS B 0601:1982) of the frictional engagement surface 13 of the clutch plate 1 in a first example was 3.3 µm. The depth of the small grooves 15 formed in the lands was approximately 0.1 to 4.0 µm. The small grooves 15 were extended from one end portion to the other end portion of each of the lands 14. The torque change rate was 20.5%.

The surface roughness Rz (JIS B 0601:1982) of the frictional engagement surface 13 of the clutch plate 1 in a second example was 3.41 µm. The depth of the small grooves 15 formed in the lands 14 was approximately 0.1 to 4.0 µm. The small grooves 15 were extended from one end portion to the other end portion of each of the lands 14. The torque change rate was 10.5%.

The surface roughness Rz (JIS B 0601:1982) of the frictional engagement surface 13 of the clutch plate 1 in a third example was 3.42 µm. The depth of the small grooves 15 formed in the lands 14 was approximately 0.1 to 4.0 µm. The small grooves 15 were extended from one end portion to the other end portion of each of the lands 14. The torque change rate was 9.5%.

The surface roughness Rz (JIS B 0601:1982) of the frictional engagement surface 13 of the clutch plate 1 in a fourth example was 3.58 µm. The depth of the small grooves 15 formed in the lands 14 was approximately 0.1 to 4.0 µm. The small grooves 15 were extended from one end portion to the other end portion of each of the lands 14. The torque change rate was 5.5%.

The surface roughness Rz (JIS B 0601:1982) of the frictional engagement surface 13 of the clutch plate 1 in a fifth example was 3.63 µm. The depth of the small grooves 15 formed in the lands 14 was approximately 0.1 to 4.0 µm. The small grooves 15 were extended from one end portion to the other end portion of each of the lands 14. The torque change rate was 5.0%.

The surface roughness Rz (JIS B 0601:1982) of the frictional engagement surface 13 of the clutch plate 1 in a sixth example was 3.65 µm. The depth of the small grooves 15 formed in the lands 14 was approximately 0.1 to 4.0 µm. The small grooves 15 were extended from one end portion to the other end portion of each of the lands 14. The torque change rate was 4.5%.

The surface roughness Rz (JIS B 0601:1982) of the frictional engagement surface 13 of the clutch plate 1 in a seventh example was 3.7 µm. The depth of the small grooves 15 formed in the lands 14 was approximately 0.1 to 4.0 µm. The small grooves 15 were extended from one end portion to the other end portion of each of the lands 14. The torque change rate was 5.0%.

The surface roughness Rz (JIS B0601:1982) of the frictional engagement surface 13 of the clutch plate 1 in an eighth example was 3.73 µm. The depth of the small grooves 15 formed in the lands 14 was approximately 0.1 to 4.0 µm. The small grooves 15 were extended from one end portion to the other end portion of each of the lands 14. The torque change rate was 2.0%.

The surface roughness Rz (JIS B 0601:1982) of the frictional engagement surface 13 of the clutch plate 1 in a ninth example was 3.75 µm. The depth of the small grooves 15 formed in the lands 14 was approximately 0.1 to 4.0 µm. The small grooves 15 were extended from one end portion to the other end portion of each of the lands 14. The torque change rate was −7.0%.

The surface roughness Rz (JIS B 0601:1982) of the frictional engagement surface 13 of the clutch plate 1 in a tenth example was 3.78 µm. The depth of the small grooves 15 formed in the lands 14 was approximately 0.1 to 4.0 µm. The small grooves 15 were extended from one end portion to the other end portion of each of the lands 14. The torque change rate was −9.5%.

The surface roughness Rz (JIS B 0601:1982) of the frictional engagement surface 13 of the clutch plate 1 in an eleventh example was 3.9 µm. The depth of the small grooves 15 formed in the lands 14 was approximately 0.1 to 4.0 µm. The small grooves 15 were extended from one end portion to the other end portion of each of the lands 14. The torque change rate was −5.5%.

In a comparative example, a clutch plate with no small grooves that are intentionally formed in the clutch plate 1 and having a surface roughness Rz (JIS B 0601:1982) of approximately 2.5 μm was used. In the comparative example, the torque change rate was 70%.

Figure 9:
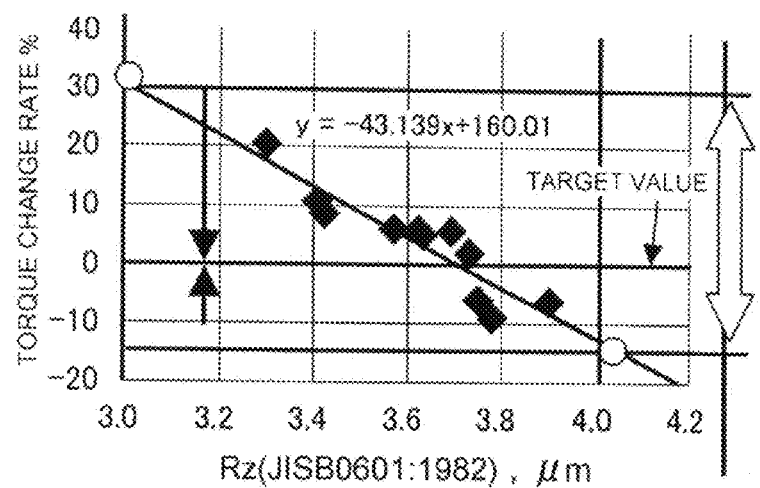
FIG. 9 is a graph illustrating the relationship between Rz (JIS B 0601:1982) and the torque change rate in the examples.
Figure 10:
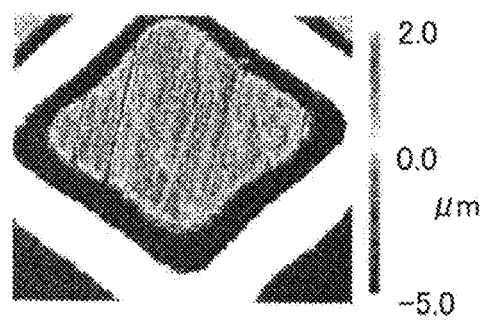
FIG. 10 is a microscopic view of an end face of the clutch plate in the eighth example, illustrating measured data of the end face.

FIG. 9 is a graph that shows the torque change rate (%) with respect to the surface roughness Rz (JIS B 0601:1982) in the following first to eleventh examples. As understood from FIG. 9, the torque change rate falls within a range of 30% to −12% as long as the surface roughness Rz (JIS B 0601:1982) of the clutch plate 1 having the small grooves 15 is within a range from 3.0 to 4.0 μm. In particular, it is preferable that the surface roughness Rz (JIS B 0601:1982) be within a range from 3.4 μm to 3.9 μm. In this case, the torque change rate falls within a range of μ10%. As an example, the surface measurement data in the eighth example is shown in FIG. 10.

In comparison with the torque change rate (approximately 60 to 70%) of the conventional clutch plate in which there are no small grooves intentionally formed and therefore the surface roughness is not increased, the clutch plates in the examples make it possible to significantly reduce the torque change rate. When the accuracy, fuel efficiency, failure prevention and required minimum torque value are taken into account, it is preferable that the torque change rate be within a range from −15% to 30%. According to the embodiment of the invention, the torque change rate falls within the range from −15% to 30%. There is a possibility that sufficient hydraulic reaction force will not be obtained if the surface roughness Rz (JIS B 0601:1982) is less than 3.0 μm, and there is a possibility that hydraulic reaction force will be excessive if the surface roughness Rz (JIS B 0601:1982) exceeds 4.0 μm, possibly causing a problem that the clutch plate 1 cannot exhibit its required function due to reduction in the torque transmitted through the clutch plate 1.

Figure 11:
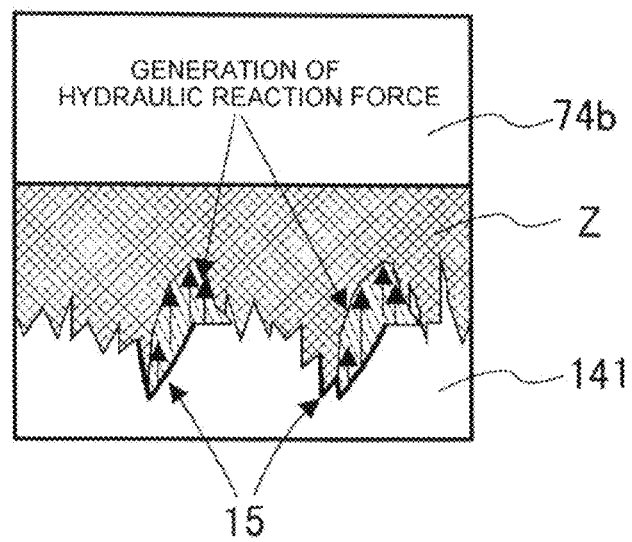
FIG. 11 is a view illustrating hydraulic reaction force.

With the clutch plate 1 and the driving force transmission system 91 in the embodiment, as illustrated in FIG. 11, the small grooves 15 generate a hydraulic reaction force in a direction that intersects with the end face 11 (in a direction substantially perpendicular to the end face 11), against the lubricating oil Z flowing (fluid inflow) in the rotational direction of the clutch plate 1. That is, the small grooves 15 generate a force in such a direction that the clutch plates frictionally engaged with the each other are separated from each other. The small grooves 15 exhibit a fluid wedge effect between the clutch plates.

The torque corresponds to a shear force τ (shear resistance) between the clutch plates. The shear force τ is expressed by τ=η×(U/h), is mainly depending upon a clearance h between the clutch plates, where η is a viscosity of the lubricating oil Z, and U is a relative speed between the clutch plates. With the provision of the small grooves 15 in the lands 14, the hydraulic reaction force is generated against the fluid inflow so as to exert influence on the clearance h between the clutch plates. Thus, it is possible to restrain the torque at a low temperature at which the viscosity of the lubricating oil Z is high, from increasing, thereby reducing the torque change rate.

In the embodiment, because the small grooves 15 are formed in the grinding step S4, manufacturing of the clutch plate 1 is facilitated. Further, the small grooves 15 are formed so as to be in parallel with a certain radial direction of the clutch plate 1, and accordingly, the small grooves 15, which are extended in directions perpendicular to the circumferential direction (rotational direction) of the clutch plate 1, are reliably formed. Thus, the small grooves 15 generate a larger hydraulic reaction force during frictional engagement (during torque transmission), and accordingly, it is possible to effectively reduce the torque change rate. Further, because the small grooves 15 are extended in one direction, the small grooves 15 are easily formed. Further, in the embodiment, the sliding area ratio of the clutch plate 1 is large, that is, 55 to 90%, and accordingly, the effect of generating the hydraulic reaction force, obtained by the formation of the small grooves 15, becomes higher.

The invention is not limited to the embodiment as described above. For example, at least one or some of the small grooves 15 may cross the circumferential direction, and further, there may be no small grooves 15 that are extended so as to be perpendicular to the circumferential direction. Alternatively, the small grooves 15 may be formed so as to be extended in a radial fashion. For example, all the small grooves 15 may be extended so as to be perpendicular to the circumferential direction. In this case, the hydraulic reaction force is generated more effectively.

The lands 14 may have a polygonal shape. Further, of course, the lands 14 a part of which is surrounded by the grooves 21 and the other part of which is surrounded by the outer peripheral edge, and the inner peripheral edge and the windows of the clutch plate 1, is included in the invention. Further, the invention includes the clutch plate 1 having no lands 14 as long as the lubrication grooves 2 and the small grooves 15 are formed in the end face 11 of the clutch plate 1. Further, the small grooves 15 may be formed by any step other than the grinding step as described above, that is, the small grooves 15 may be scratches formed by cutting, scratches formed by pressing, or grooves formed by etching. For example, if the small grooves 15 are formed by press working or etching, the small grooves 15 are formed with a high degree of flexibility and a high degree of accuracy. However, the formation of the small grooves 15 by grinding is more advantageous because the grinding step S4 is utilized and therefore an increase in the manufacturing cost is suppressed.

In the method of manufacturing the clutch plate 1, a flat pressing step may be added. Further, the DLC step may be omitted. Further, even if the sliding area ratio is out of the above-mentioned range, the small grooves 15 exhibit the effect of suppressing the torque change rate. However, if the sliding area ratio becomes larger, the effect of suppressing the torque change rate due to the formation of the small grooves 15 becomes higher. Thus, it is preferable to increase the sliding area ratio. In the clutch plate 1 according to the embodiment, each of a large number of the lands 14 (hills) is defined and surrounded by the four non-differentiable points and the four differentiable curves. Alternatively, each of the lands 14 may be defined and surrounded by two non-differentiable points and two differentiable curves. Alternatively, the each of the lands 14 may be defined and surrounded by three non-differentiable points and three differentiable curves. Alternatively, each of the lands 14 may be defined and surrounded by five or more non-differentiable points and differentiable curves of which the number is equal to the number of the non-differentiable points.

With the clutch plate, the clutch unit and the power transmissions system according to the invention, the small grooves generate the hydraulic reaction force in a direction that crosses the surface of the clutch plate (in a direction substantially perpendicular to the surface of the clutch plate), against the lubricating oil flowing in the rotational direction of the clutch plate. That is, the small grooves generate a force in such a direction that the clutch plates frictionally engaged to each other are separated from each other. Thus, the torque at a low temperature at which the viscosity of the lubricating oil is high is restrained from increasing, and, as a result, it is possible to reduce the torque change rate.

What is claimed is:

1. A driving force transmission system, comprising:
   an annular wet clutch plate having lubrication grooves formed of multiple grooves in at least one of both axial end faces, the at least one of the both end faces having the lubrication grooves and a frictional engagement surface, wherein the frictional engagement surface is covered with a diamond-like carbon film and has a plurality of small grooves having a width and a depth that are smaller than those of the lubrication grooves, at least one of the small grooves is extended in a direction that crosses a circumferential direction of the annular clutch plate; and a mean value of surface roughness of the frictional engagement surface having the small grooves is a value equal to or higher than 3.0 μm but equal to or less than 4.0 μm when the surface roughness is measured with use of Rz (JIS B 0601:1982) at three positions that are offset from each other by 120° in the circumferential direction around a central axis of the annular clutch plate;
   a second clutch plate that is arranged so as to be opposed to the end face, and that is formed in an annular shape around a second center;
   a first rotary member arranged so that the clutch plate is immovable in a circumferential direction but movable in an axial direction;
   a second rotary member arranged so that the second clutch plate is immovable in a circumferential direction but movable in the axial direction; and
   lubricating oil retained between the clutch plate and the second clutch plate,
   wherein the first rotary member and the second rotary member are placed in state where torque is allowed to be transmitted, when the clutch plate and the second clutch plate are engaged with each other, and placed in a state where torque is not allowed to be transmitted, when the clutch plate and the second clutch plate are disengaged from each other, and
   wherein the small grooves have a depth of no more than about 4 μm, and a change in the torque being transmitted when the clutch plate and the second clutch plate are engaged with each other at a temperature of minus 40° C. with respect to a torque being transmitted when the clutch plate and the second clutch plate are engaged with each other at a temperature of 50° C. is 30% or less.

2. The driving force transmission system according to claim 1, further comprising:
   a first pressing member located one axial side of the clutch plate and the second clutch plate that are arranged coaxially; and
   a second pressing member located on the other axial side of the clutch plate and the second clutch plate,
   wherein the first pressing member and the second pressing member fasten the clutch plate and the second clutch plate in the axial direction so as to establish the state where torque is allowed to be transmitted, and cancel fastening of the clutch plate and the second clutch plate in the axial direction so as to establish the state where torque is not allowed to be transmitted.

3. The driving force transmission system according to claim 1, wherein the second clutch plate has a second frictional engagement surface that is engageable with the frictional engagement surface, and annular grooves or spiral grooves formed around the second center.

4. The driving force transmission system according to claim 2, wherein the second clutch plate has a second frictional engagement surface that is engageable with the frictional engagement surface, and annular grooves or spiral grooves formed around the second center.

5. A driving force transmission system, comprising:
   an annular wet clutch plate having lubrication grooves formed of multiple grooves in at least one of both axial end faces, the at least one of the both end faces having the lubrication grooves and a frictional engagement surface, wherein the frictional engagement surface is covered with a diamond-like carbon film and has a plurality of small grooves having a width and a depth that are smaller than those of the lubrication grooves, at least one of the small grooves is extended in a direction that crosses a circumferential direction of the annular clutch plate; and a mean value of surface roughness of the frictional engagement surface having the small grooves is a value equal to or higher than 3.0 μm but equal to or less than 4.0 μm when the surface roughness is measured with use of Rz (JIS B 0601:1982) at three positions that are offset from each other by 120° in the circumferential direction around a central axis of the annular clutch plate;
   a second clutch plate that is arranged so as to be opposed to the end face, and that is formed in an annular shape around a second center;
   a first rotary member arranged so that the clutch plate is immovable in a circumferential direction but movable in an axial direction;
   a second rotary member arranged so that the second clutch plate is immovable in a circumferential direction but movable in the axial direction; and
   lubricating oil retained between the clutch plate and the second clutch plate,
   wherein the first rotary member and the second rotary member are placed in state where torque is allowed to be transmitted, when the clutch plate and the second clutch plate are engaged with each other, and placed in a state where torque is not allowed to be transmitted, when the clutch plate and the second clutch plate are disengaged from each other,
   wherein the mean value of surface roughness of the frictional engagement surface having the small grooves is between 3.4 μm and 3.9 μm, the small grooves have a depth of no more than about 4 μm, and a change in the torque being transmitted when the clutch plate and the second clutch plate are engaged with each other at a temperature of minus 40° C. with respect to a torque being transmitted when the clutch plate and the second clutch plate are engaged with each other at a temperature of 50° C. is 10% or less.

6. The driving force transmission system according to claim 1, wherein a sliding area ratio that is a ratio of the frictional engagement surface to the end face is about 58%.

7. The driving force transmission system according to claim 5, further comprising:
   a first pressing member located one axial side of the clutch plate and the second clutch plate that are arranged coaxially; and
   a second pressing member located on the other axial side of the clutch plate and the second clutch plate,
   wherein the first pressing member and the second pressing member fasten the clutch plate and the second clutch plate in the axial direction so as to establish the state where torque is allowed to be transmitted, and cancel fastening of the clutch plate and the second clutch plate in the axial direction so as to establish the state where torque is not allowed to be transmitted.

8. The driving force transmission system according to claim 5, wherein the second clutch plate has a second frictional engagement surface that is engageable with the frictional engagement surface, and annular grooves or spiral grooves formed around the second center.

9. The driving force transmission system according to claim 7, wherein the second clutch plate has a second frictional engagement surface that is engageable with the frictional engagement surface, and annular grooves or spiral grooves formed around the second center.

10. The driving force transmission system according to claim 5, wherein a sliding area ratio that is a ratio of the frictional engagement surface to the end face is about 58%.

11. The driving force transmission system according to claim 1, wherein a change in the torque being transmitted when the clutch plate and the second clutch plate are engaged with each other at a temperature of minus 40° C. with respect to a torque being transmitted when the clutch plate and the second clutch plate are engaged with each other at a temperature of 50° C. is 20% or less.

* * * * *